US007013426B1

(12) United States Patent
Ingersoll

(10) Patent No.: US 7,013,426 B1
(45) Date of Patent: Mar. 14, 2006

(54) EXCHANGING AND CONVERTING DOCUMENT VERSIONS

(75) Inventor: Chris Ingersoll, Berkeley, CA (US)

(73) Assignee: Commerce One, LLC, San Ramon, CA (US)

( * ) Notice: Subject to any disclaimer, the term of this patent is extended or adjusted under 35 U.S.C. 154(b) by 586 days.

(21) Appl. No.: 09/989,977

(22) Filed: Nov. 20, 2001

(51) Int. Cl.
*G06F 7/00* (2006.01)

(52) U.S. Cl. ....................................... 715/523; 715/522

(58) Field of Classification Search ........ 715/522–524, 715/513, 500, 511; 709/201, 203
See application file for complete search history.

(56) References Cited

U.S. PATENT DOCUMENTS

| | | | | |
|---|---|---|---|---|
| 5,655,130 A * | 8/1997 | Dodge et al. | ............... | 715/511 |
| 5,671,428 A * | 9/1997 | Muranaga et al. | .......... | 345/751 |
| 5,890,177 A * | 3/1999 | Moody et al. | .............. | 715/511 |
| 6,393,442 B1 * | 5/2002 | Cromarty et al. | ........... | 715/523 |
| 2004/0205613 A1 * | 10/2004 | Li et al. | ..................... | 715/523 |

* cited by examiner

*Primary Examiner*—Cesar Paula

(74) *Attorney, Agent, or Firm*—Thelen Reid & Priest LLP; Marc S. Hanish

(57) ABSTRACT

Document version interoperability is provided by allowing members of a community to maintain independent migration by permitting the members to continue to run native application software on their respective systems. A community may define a community version by establishing certain rules for documents. When electronically transmitting a document, a member of the community may provide in the transmitted message containing the document his native version of the document, the community version of the document, as well as any or all versions of the document which are closer to the community version of the document than his native version of the document. This may be accomplished by performing document transformations when creating the message. Upon receipt of the documents, the recipient may choose the document version contained in the message that is most easily read by the recipient's native application program and transform it so that it may be opened by the recipients native application program if necessary. Regardless of what rules are established to define the community version, data loss in any document exchange is minimized. Entities that follow these rules can migrate their native support without requiring coordination with other entities. Members do not have to know the native version supported by other members. This ensures privacy for the members and also lessens the need for direct communications between the members.

45 Claims, 4 Drawing Sheets

EXCHANGING AND CONVERTING DOCUMENT VERSIONS

FIELD OF THE INVENTION

The present invention relates to the versioning of software documents. More specifically, the present invention relates to document version interoperability.

BACKGROUND OF THE INVENTION

Computer software programs often produce documents. Examples of such programs include word processors, spreadsheets, and graphic creators, among others. Documents normally contain data saved in a format that may or may not be specific to the piece of software used to create it. For example, a word processor may save a document in a format that only that word processor could read, or some word processors may have the ability to save a document in a format that other types of word processors or even other programs can read.

An e-commerce community comprises a number of entities, normally various businesses or applications within a single business, who exchange business documents with each other. Examples of documents typically exchanged in e-commerce communities include purchase orders, requests for quotes, and sales confirmations, among others. The entities exchanging the documents typically include trading partners, internal applications, and business services.

Exchange of these business documents normally is accomplished by defining a structure and representing the business logic in documents based on that structure. Often, a markup language, such as Extensible Markup Language (XML) is used. The documents may be wrapped in electronic messages and exchanged over an e-marketplace.

Each business document exchange may represent a named portion of a business transaction. However, the potential logic represented by the named business document may evolve over time. In the case of XML-based documents, a schema or DTD is updated and available data elements may be added, removed, or changed in new incarnations of the logic. This evolution of business document structure is called versioning.

Each new structure defines a new version of that business document. However, when dealing in an e-marketplace, it is quite common that one or more members of the trading community does not natively support all versions of all business documents traded in their community. This creates a situation where documents may be sent to entities that do not understand their structure.

Historically, formats used for the exchange of information such as Electronic Data Exchange (EDI) have solved this problem in one of two ways. The first solution is to define a community version and require that all participating entities (trading partners, internal applications, business services) comply with that community version. Two problems with this approach are potential data loss and synchronized migration.

A data loss example is two entities that natively support the same higher level document than the community version and translate to the community version before sending and back after receiving. If all the logic in the higher level document is not representable in the lower, this document exchange is not as rich as a pure native version exchange.

Another problem with this approach is that it requires potentially expensive coordination between entities to synchronize migration to a new document version.

The second solution is to force the receiver of the document to support all possible sender formats, perhaps by translating to a version he can understand. This solution also requires coordination migration of a community to a new version. If one member migrates to a new versions, all potential receivers from this member must be able to support this new version (perhaps via translation).

What is needed is a solution that allows for the exchange of documents with minimal data loss while still providing for independent migration by the participants.

BRIEF DESCRIPTION OF THE INVENTION

Document version interoperability is provided by allowing members of a community to maintain independent migration by permitting the members to continue to run native application software on their respective systems. A community may define a community version by establishing certain rules for documents. When electronically transmitting a document, a member of the community may provide in the transmitted message containing the document his native version of the document, the community version of the document, as well as any or all versions of the document which are closer to the community version of the document than his native version of the document. This may be accomplished by performing document transformations when creating the message. Upon receipt of the documents, the recipient may choose the document version contained in the message that is most easily read by the recipient's native application program and transform it so that it may be opened by the recipients native application program if necessary. Regardless of what rules are established to define the community version, data loss in any document exchange is minimized. Entities that follow these rules can migrate their native support without requiring coordination with other entities. Members do not have to know the native version supported by other members. This ensures privacy for the members and also lessens the need for direct communications between the members.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
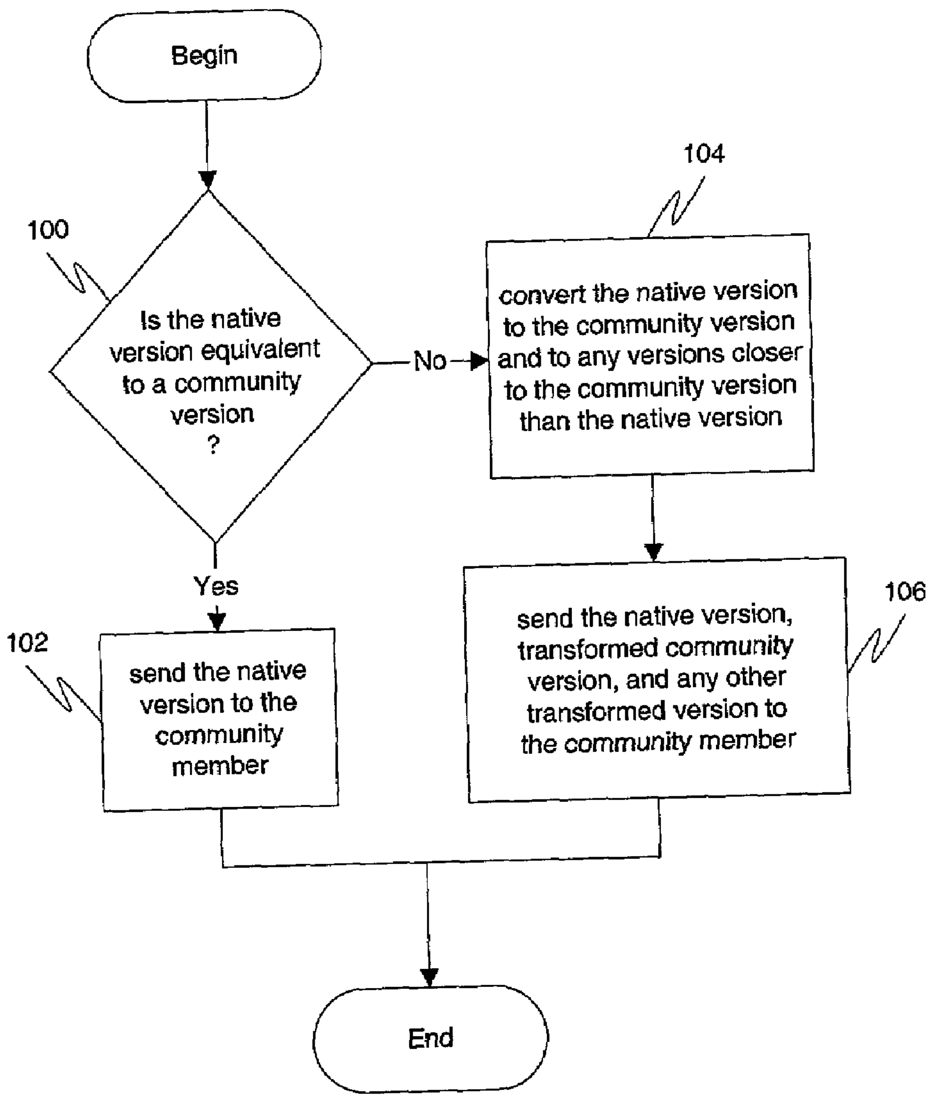
FIG. 1 is a flow diagram illustrating a method for sending a document to a community member in accordance with a specific embodiment of the present invention.

Embodiments of the present invention are described herein in the context of a system of computers, servers, communication mechanisms, and tags. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Document version interoperability is provided by allowing members of a community to maintain independent migration by permitting the members to continue to run native application software on their respective systems. It allows members to maintain independent migration by allowing them to continue to run native software on their systems. A community may define a community version by establishing certain rules for documents. When electronically transmitting a document, a member of the community may provide in the transmitted message containing the document his native version of the document, the community version of the document, as well as any or all versions of the document which are closer to the community version of the document than his native version of the document. This may be accomplished by performing document transformations when creating the message. Upon receipt of the documents, the recipient may choose the document version contained in the message that is most easily read by the recipient's native application program and transform it so that it may be opened by the recipients native application program if necessary. Regardless of what rules are established to define the community version, data loss in any document exchange is minimized. Entities that follow these rules can migrate their native support without requiring coordination with other entities. Members do not have to know the native version supported by other members. This ensures privacy for the members and also lessens the need for direct communications between the members.

Another advantage the present invention provides is that the recipients don't necessarily have to know about this scheme. If they support the community version of the document natively, then they may simply ignore any extraneous documents contained within the message. Only recipients who do not natively support the community version of the document need to implement the present invention, and all recipients, no matter which version of the document they support natively, may then exchange information easily.

The present invention will be discussed in terms of its application to an e-commerce community exchanging business documents. However, one of ordinary skill in the art will recognize that implementations are possible involving data exchange in general and any type of document that needs to be share between two or more parties.

In the present invention, a community version is defined for the structure of each business document. Typically, this community version will be the most recent version available, but there may be cases where a less recent version is more desirable. Members are capable of transforming between their native version of the application software and the community version as well as all versions that are closer to the community version than their native version. Closeness is a concept that will be discussed in greater detail later in this application.

When sending a document, members perform transformations between their native version of the document, the community version of the document, and all versions of the document closer to the community version of the document than their native version of the document. All of these transformations are then packed into a message and sent. Upon receipt of the message, the receiving member may then choose the document version closest to the natively supported version. A transformation may be performed if necessary.

Closeness may be defined as the amount of data loss that is incurred when transforming between versions of documents. If one version of a document is closer than another, it can be transformed with less data loss.

FIG. 1 is a flow diagram illustrating a method for sending a document to a community member in accordance with a specific embodiment of the present invention. The document may be saved in a version native to the member executing the method. At 100, it is determined if the native version is equivalent to a community version of the document. If so, at 102, the native version of the document is sent to the community member. If the native version of the document is not equivalent to the community version of the document, at 104 the native version of the document is converted to the community version of the document and to any versions of the document closer to the community version than the native version. Then, at 106, the native version, transformed community version, and any other transformed version of the document are all sent to the community member.

Figure 2:
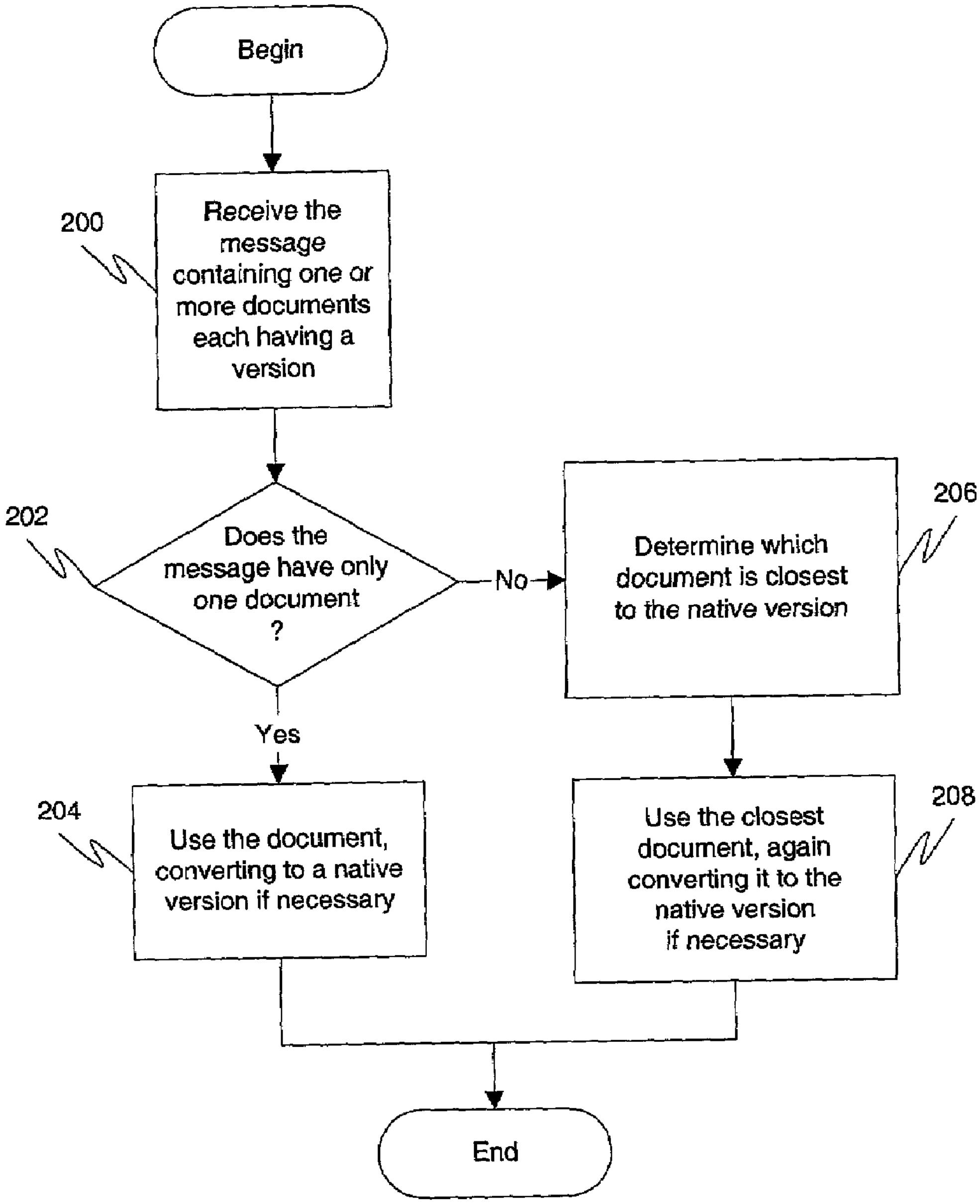
FIG. 2 is a flow diagram illustrating a method for receiving a document from a community member in accordance with a specific embodiment of the present invention.

FIG. 2 is a flow diagram illustrating a method for receiving a document from a community member in accordance with a specific embodiment of the present invention. At 200, a message is received, the message containing one or more documents each having a version. At 202, it is determined if the message has only one document. If it does, then that document must be the community version of the document, and thus at 204 the document may be used, converting to a native version of the document if necessary. If there was more than one document in the message, then at 206 it is determined which document is closest to the native version of the document. That closest document is then used at 208, again converting it to the native version of the document if necessary.

The present invention may be implemented using a versioning library interfacing with the community. The versioning library may be included with a software produce sold for portal connections. This implementation will be discussed herein, but other implementations are possible within the scope of the disclosure.

A library of schema representation for business documents may be utilized. This library keeps track of all the possible schemas for the business documents used in the community. For example, there may be three different schema for business documents, known as versions 2.0, 2.2, and 3.0. These three schemas may be stored in this library.

A special type of enveloping scheme (known herein as MarketSite Message Layer, or MML) may be used to allow a primary document to be accompanied by any number of attachments when it is sent. The versioning library may put the community version as the primary document, and the alternate versions as attachments using a consistent attachment naming scheme that encompasses the document type and version of the attachment.

A message may hold one, and only one document, whereas other documents are added as attachments. Attachments may be XML documents as well as any other type of format. Messages may also contain a property list with a key, value pairs, a context document, and a catalog document used to resolve references to attachments.

Messages may have properties, which may be used for routing and/or bookkeeping. This design differentiates between managed properties and user-provided properties. Managed properties are written once and then from that point on are read-only. User provided properties have no such limitations. In a specific embodiment of the present invention, properties are richer than the default Java properties class as they can have an associated parameter list.

Different properties may be set by different places in the system and at different times. Table 1 below illustrates a list of potential properties, where they are set in the system, when they are set, and why they are set.

as a instance called by the class defining message properties in its constructor. It then may use the value of a string that describes the managed keys to decide which properties are managed and which are user defined.

The catalog document described earlier is maintained in the message to be the first data used when resolving references within the document. For example, a document could be referring to an attachment in the same message. The catalog will then help to resolve that relationship.

The context document described earlier may be carried within the message to keep the current context available. The context may have relevance to security, document exchange protocols, and transactions.

There may also be two different levels of support for attachments. The first may be to stored attachments in the message itself. The second may be to have a Universal Resource Identifier (URI) be bound to an element in the document. This URI may be used to bind the attachment in the message. This second level of support may be called "Named and Bound attachments", whereas the first level of support may be simply called "attachments". An iterator on the message may be provided when named and bound attachments are not used.

On the client side, a programmer is concerned with creating the message and sending it to the business partner for processing by a business service. When a named and bound attachment is used, the developer needs to the set the reference attribute on the element. In doing so, a URI is used, the same URI that will later be used when adding the attachment to the message. Alternatively, link classes may be implemented to create an even stronger binding.

TABLE 1

| Property | Who? | When? | Why? |
|---|---|---|---|
| x-Document-Type | Message | Message creation time | To enable fast routing on the server. |
| x-Message-Id | Message | Message creation time | To track messages. |
| x-Correlation-Id | Service | Service has reply document ready, want to publish back | To track messages, and resulting messages. |
| x-Request-Mode | Transmitter | Set when the message is passed in. | To let the sender specify processing hints related to the request. Read more below. |
| x-Date-Received | Server Agent | When the Message reaches the server. | To keep some bookkeeping regarding dates. System and legal reasons. |
| x-Date-Sent | Transmitter closest to the wire. E.g. an InternalPublisher doesn't set this property. | Just before the Message is sent over the wire | To keep some bookkeeping regarding dates. System and legal reasons. |
| x-Receiver-Id | Transmitter returned from first lookup. | Lookup required receiver info, stored in resulting Transmitter instance. Set when the message is passed in. | To make sure the Message reaches the right destination. May it be a hosted, or integrated service. Used for routing on the server. |
| x-Sender-Id | Transmitter returned from first lookup. | Set when the message is passed in. | To make sure the recipient has enough knowledge to lookup info it needs, e.g. preferred callback address. |

The message property x-Request-Mode is used to hold processing hints. A hint is designed to override any default values the receiver has stored or looked-up. Hints may be ignored due to transport, or to server policies.

Constants for the keys of the managed properties may then be stored in a general class. An application developer may add properties for its own processing. However, policies to guarantee uniqueness may have to be introduced if this is the case. This may be accomplished by using the general class created for the keys of the managed property When the message is received by the server side, the element is the same as was created at the client side, except that a few more properties may have been added along the way.

The versioning library also has two settings for the versions of each document, internal and external version. The internal version defines the native version used by an endpoint. The external version is the community version. The versioning library is invoked when the messages are sent or received in order to modify the messages in accordance with the rules.

A separate transformation registry may be used to store the transformation logic between various versions of document types. In a specific embodiment of the present invention, a table is used for the transformation registry. Entries in this table may define the linkages between documents in separate version and identify the Java class or Extensible Syntax Language Transformation (XSLT) file that performs the transformation.

Closeness may be defined in a number of different ways. In a specific embodiment of the present invention, the versioning library assumes that there is no data loss from a lower version to a higher version of a document, but there is data loss when converting from a higher version to a lower of a document. Thus, when determining the closest version of a document to a given document version, the system may first look to available higher version numbers of the document, and then take the mathematically closest higher version to the given document version. Only if there are no available higher version numbers will the system look to lower numbers, taking the mathematically closest lower version to the given version. This assumes a decimal or other mathematical numbering scheme, but one of ordinary skill in the art will recognize that embodiments are possible with other types of versioning schemes, such as using letters, codes, or labels.

Figure 3:
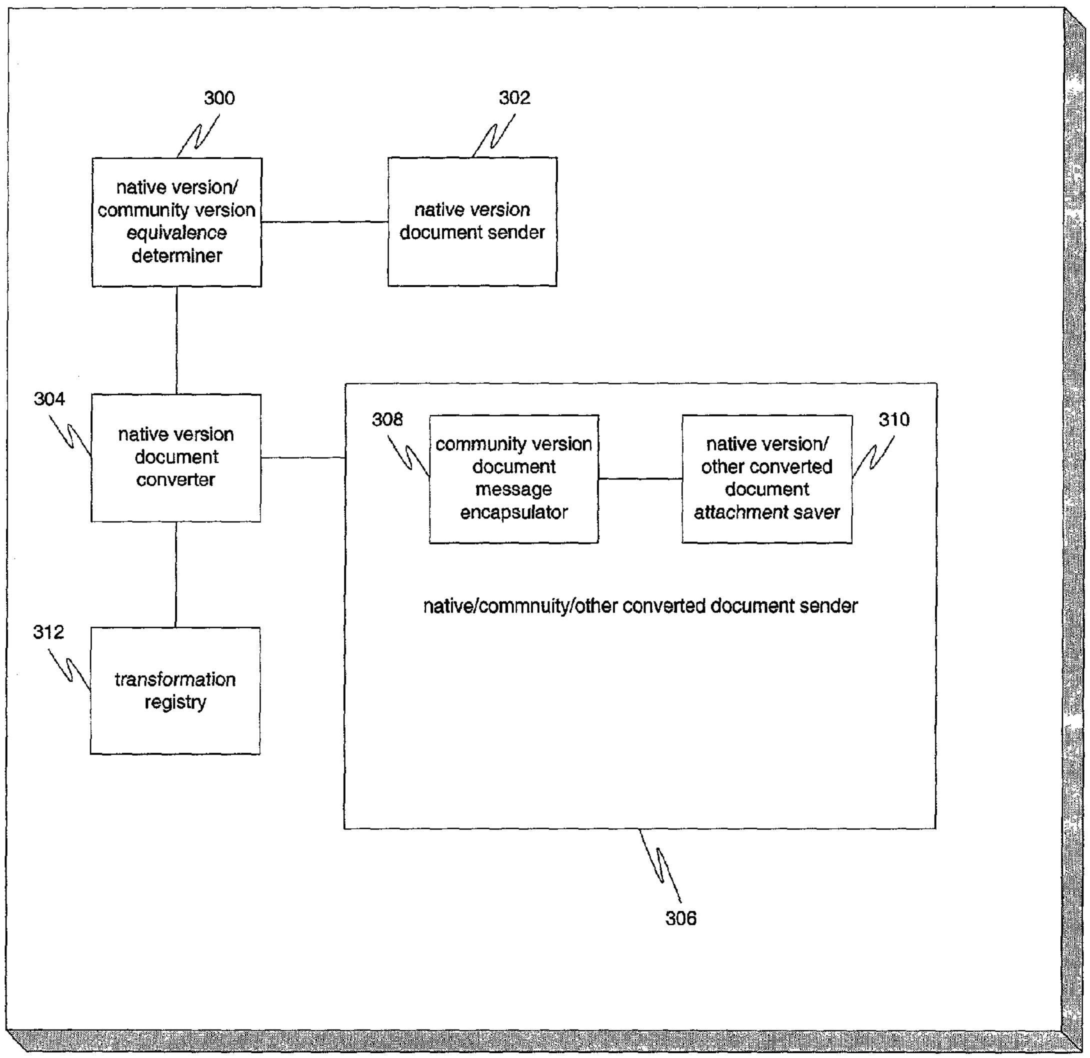
FIG. 3 is a block diagram illustrating an apparatus for sending a document to a community member in accordance with a specific embodiment of the present invention.

FIG. 3 is a block diagram illustrating an apparatus for sending a document to a community member in accordance with a specific embodiment of the present invention. The document may be saved in a version native to the member executing the method. A native version/community version equivalence determiner 300 determines if the native version of the document is equivalent to a community version of the document. If so, a native version document sender 302 coupled to the native version/community version equivalence determiner 300 sends the native version of the document to the community member. If the native version of the document is not equivalent to the community version of the document, a native version document converter 304 coupled to the native version/community version equivalence determiner 300 converts the native version to the community version and to any versions closer to the community version than the native version. Then, a native/community/other converted document sender 306 coupled to the native version document converter 304 sends the native version, transformed community version, and any other transformed version of the document to the community member. The native/community/other converted document sender 306 may include a community version document message encapsulator 308, which encapsulates the community version document in a message, and a native version/other converted document attachment saver 310 coupled to the community version document message encapsulator 308, which saves the native version document and any other converted document as an attachment to the message. A transformation registry 312 may contain information as to how to transform documents between versions.

Figure 4:
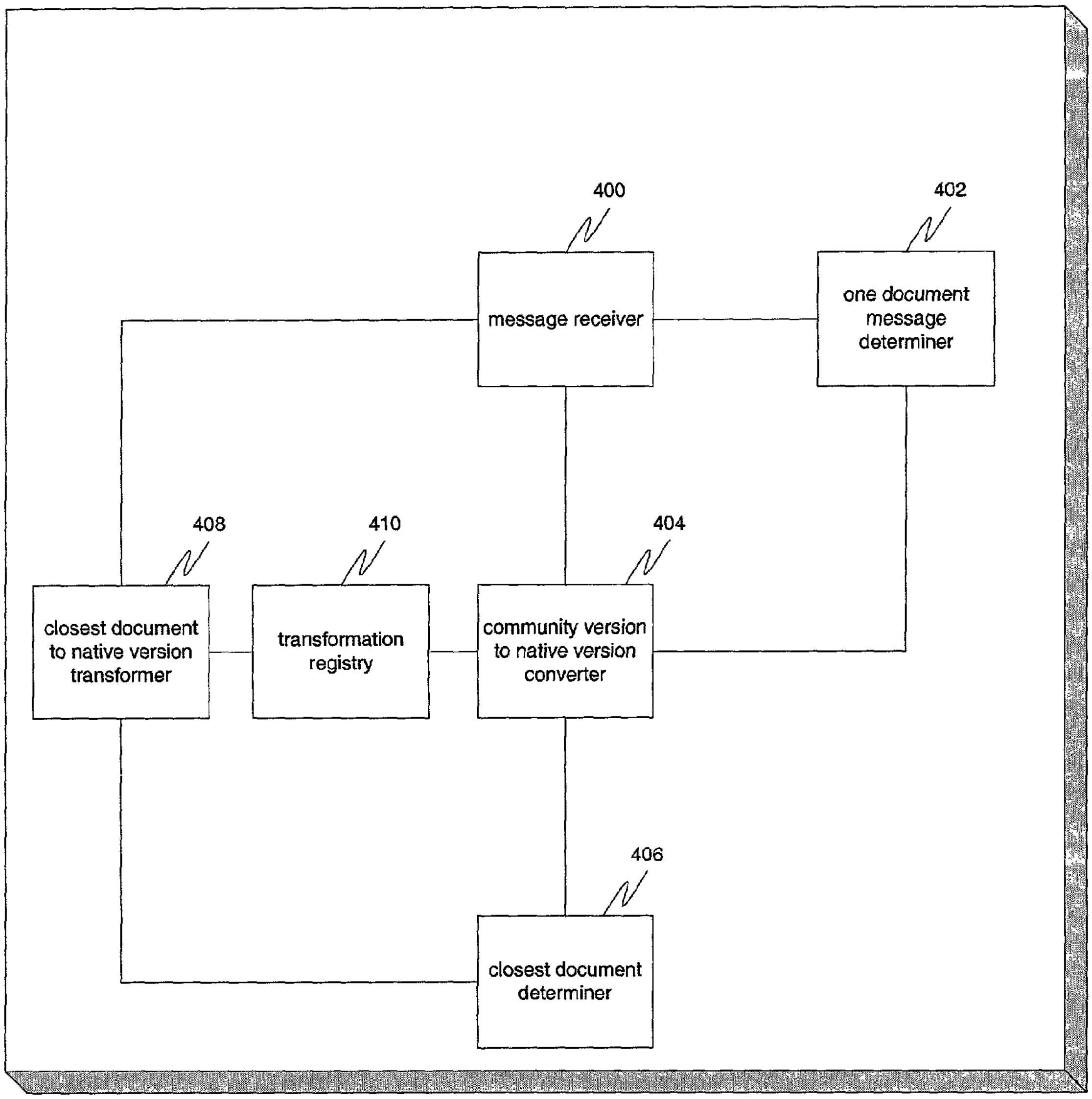
FIG. 4 is a block diagram illustrating an apparatus for receiving a document from a community member in accordance with a specific embodiment of the present invention.

FIG. 4 is a block diagram illustrating an apparatus for receiving a document from a community member in accordance with a specific embodiment of the present invention. A message receiver 400 receives a message, the message containing one or more documents each having a version. A one document message determiner 402 coupled to the message receiver determines if the message has only one document. If it does, then that document must be the community version, and thus the document may be used, converting to a native version of the document if necessary using a community version to native version converter 404 coupled to the message receiver 400 and the one document message determiner. If there was more than one document in the message, then a closest document determiner 406 coupled to the community version to native version converter 404 determines which document is closest to the native version. That closest document is then used, converting it to the native version using a closest document to native version transformer 408 coupled to the message receiver 400 and the closest document determiner 406 if necessary. A transformation registry 410 may contain information as to how to transform documents between versions.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for sending an electronically perceivable document to a second community member from a first community member, the document saved in a version native to the first community member, the method including:

determining if the native version is equivalent to a community version;

sending the native version document to the second community member if the native version is equivalent to said community version;

converting the native version document to said community version and to all versions closer to said community version than the native version if the native version is not equivalent to said community version; and sending the native version document, community version document, and any other converted documents to the second community member if the native version is not equivalent to said community version.

2. The method of claim 1, wherein said sending the native version document, community version document, and any other converted documents to the second community member includes:

encapsulating said community version document in a message; and saving said native version document and any other converted documents as attachments to said message.

3. The method of claim 2, wherein said message further contains:

a key;

one or more value pairs;

a context document; and a catalog document.

4. The method of claim 2, wherein said message has one or more properties, each of said properties being either managed or user-provided.

5. The method of claim 3, wherein said catalog document aids in resolving a reference within said message.

6. The method of claim 2, wherein said saving includes storing said attachments in the message itself.

7. The method of claim 2, wherein said saving includes binding a universal resource identifier (URI) to an element in said document.

8. The method of claim 1, wherein said converting includes accessing a transformation registry to determine how to convert between versions.

9. A computer-implemented method for receiving an electronically perceivable document from a first community member at a second community member, the method including:

receiving a message from said first community member;

determining if said message has only one document;

converting, if said message has only one document, said only one document from a community version to a version native to said second community member if said message has only one document and said version native to said second community member is not equivalent to said community version;

determining, if said message has more than one document, which of said more than one document is closest to a version native to said second community member, said closest document having a version; and transforming, if said message has more than one document said closest document to said version native to said second community member if said message has more than one document and said version native to said second community member is not equivalent to said version of said closest document.

10. The method of claim 9, wherein said message contains a community version of the document as well as attachments for a version of the document native to said first community member and any other converted documents representing versions closer to said version native to said first community member than said community version.

11. The method of claim 9, wherein said message further contains:

a key;

one or more value pairs;

a context document; and a catalog document.

12. The method of claim 9, wherein said message has one or more properties, each of said properties being either managed or user-provided.

13. The method of claim 11, wherein said catalog document aids in resolving a reference within said message.

14. The method of claim 9, wherein said converting and transforming each include accessing a transformation registry to determine how to convert between versions.

15. A computer-implemented method for communicating an electronically perceivable document from a first community member to a second community member, the document saved in a version native to the first community member, the method including:

determining if the version native to the first community member is equivalent to a community version;

sending the document to the second community member in a message if the version native to the first community member is equivalent to said community version;

converting the document to said community version and to all versions closer to said community version than the version native to the first community member if the version native to the first community member is not equivalent to said community version;

sending the document, community version document, and any other converted documents to the second community member by encapsulating said community version document in a message and saving said document and any other converted documents as attachments to said message if the version native to the first community member is not equivalent to said community version;

receiving said message from said first community member;

determining if said message has only one document;

converting said document from a community version to a version native to said second community member if said message has only one document and said version native to said second community member is not equivalent to said community version;

determining which of said documents is closest to a version native to said second community member if said message ha more than one document, said closest document having a version; and transforming said closest document to said version native to said second community member if said message has more than one document and said version native to said second community member is not equivalent to said version of said closest document.

16. The method of claim 15, wherein said message further contains:

a key;

one or more value pairs;

a context document; and a catalog document.

17. The method of claim 15, wherein said message has one or more properties, each of said properties being either managed or user-provided.

18. The method of claim 16, wherein said catalog document aids in resolving a reference within said message.

19. The method of claim 15, wherein said saving includes storing said attachments in the message itself.

20. The method of claim 15, wherein said saving includes binding a universal resource identifier (URI) to an element in said document.

21. The method of claim 15, wherein said converting the document to said community version, said converting said document from a community version to a version native to said second community member, and said transforming each include accessing a transformation registry to determine how to convert between versions.

22. A program storage device readable by a machine, tangibly embodying a program of instructions executable by the machine to perform a method for sending a document to a second community member from a first community member, the document saved in a version native to the first community member, the method including:

determining if the native version is equivalent to a community version;

sending the native version document to the second community member if the native version is equivalent to said community version;

converting the native version document to said community version and to all versions closer to said community version than the native version if the native version is not equivalent to said community version; and sending the native version document, community version document, and any other converted documents to the second community member if the native version is not equivalent to said community version.

23. A program storage device readable by a machine, tangibly embodying a program of instructions executable by the machine to perform a method for receiving a document from a first community member at a second community member, the method including:

receiving a message from said first community member;

determining if said message has only one document;

converting, if said message has only one document, said only one document from a community version to a version native to said second community member if said message has only one document and said version native to said second community member is not equivalent to said community version;

determining, if said message has more than one document, which of said more than one document is closest to a version native to said second community member, said closest document having a version; and transforming, if said message has more than one document, said closest document to said version native to said second community member if said message has more than one document and said version native to said second community member is not equivalent to said version of said closest document.

24. A program storage device readable by a machine, tangibly embodying a program of instructions executable by the machine to perform a method for communicating a document from a first community member to a second community member, the document saved in a version native to the first community member, the method including:

determining if the version native to the first community member is equivalent to a community version;

sending the document to the second community member in a message if the version native to the first community member is equivalent to said community version;

converting the document to said community version and to all versions closer to said community version than the version native to the first community member if the version native to the first community member is not equivalent to said community version;

sending the document, community version document, and any other converted documents to the second community member by encapsulating said community version document in a message and saving said document and any other converted documents as attachments to said message if the version native to the first community member is not equivalent to said community versions;

receiving said message from said first community member;

determining if said message has only one document;

converting said document from a community version to a version native to said second community member if said message has only one document and said version native to said second community member is not equivalent to said community version;

determining which of said documents is closest to a version native to said second community member if said message has more than one document, said closest document having a version; and transforming said closest document to said version native to said second community member if said message has more than one document and said version native to said second community member is not equivalent to said version of said closest document.

25. An apparatus for sending a document to a second community member from a first community member, the document saved in a version native to the first community member, the apparatus including:

means for determining if the native version is equivalent to a community version;

means for sending the native version document to the second community member if the native version is equivalent to said community version;

means for converting the native version document to said community version and to all versions closer to said community version than the native version if the native version is not equivalent to said community version; and means for sending the native version document, community version document, and any other converted documents to the second community member if the native version is not equivalent to said community version.

26. The apparatus of claim 25, wherein said means for sending the native version document, community version document, and any other converted documents to the second community member includes:

means for encapsulating said community version document in a message; and means for saving said native version document and any other converted documents as attachments to said message.

27. The apparatus of claim 26, wherein said message further contains:

a key;

one or more value pairs;

a context document; and a catalog document.

28. The apparatus of claim 27, wherein said catalog document aids in resolving a reference within said message.

29. The apparatus of claim 26, wherein said message has one or more properties, each of said properties being either managed or user-provided.

30. The apparatus of claim 26, wherein said means for saving includes means for storing said attachments in the message itself.

31. The apparatus of claim 26, wherein said means for saving includes means for binding a universal resource identifier (URI) to an element in said document.

32. The apparatus of claim 25, wherein said means for converting includes means for accessing a transformation registry to determine how to convert between versions.

33. An apparatus for receiving a document from a first community member at a second community member, the apparatus including:

means for receiving a message from said first community member;

means for determining if said message has only one document;

means for converting, if said message has only one document, said only one document from a community version to a version native to said second community member if said message has only one document and said version native to said second community member is not equivalent to said community version;

means for determining, if said message has more than one document, which of said more than one document is closest to a version native to said second community member, said closest document having a version; and means for transforming, if said message has more than one document, said closest document to said version native to said second community member if said message has more than one document and said version native to said second community member is not equivalent to said version of said closest document.

34. The apparatus of claim 33, wherein said message contains a community version of the document as well as attachments for a version of the document native to said first community member and any other converted documents representing versions closer to said version native to said first community member than said community version.

35. The apparatus of claim 33, wherein said message further contains:

a key;

one or more value pairs;

a context document; and a catalog document.

36. The apparatus of claim 35, wherein said catalog document aids in resolving a reference within said message.

37. The apparatus of claim 33, wherein said message has one or more properties, each of said properties being either managed or user-provided.

38. The apparatus of claim 33, wherein said means for converting and means for transforming each include means for accessing a transformation registry to determine how to convert between versions.

39. An apparatus for communicating a document from a first community member to a second community member, the document saved in a version native to the first community member, the apparatus including:

means for determining if the version native to the first community member is equivalent to a community version;

means for sending the document to the second community member in a message if the version native to the first community member is equivalent to said community version;

means for converting the document to said community version and to all versions closer to said community version than the version native to the first community member if the version native to the first community member is not equivalent to said community version;

means for sending the document, community version document, and any other converted documents to the second community member by encapsulating said community version document in a message and saving said document and any other converted documents as attachments to said message if the version native to the first community member is not equivalent to said community version;

means for receiving said message from said first community member;

means for determining if said message has only one document;

means for converting said document from a community version to a version native to said second community member if said message has only one document and said version native to said second community member is not equivalent to said community version;

means for determining which of said documents is closest to a version native to said second community member if said message has more than one document, said closest document having a version; and means for transforming said closest document to said version native to said second community member if said message has more than one document and said version native to said second community member is not equivalent to said version of said closest document.

40. The apparatus of claim 39, wherein said message further contains:

a key;

one or more value pairs;

a context document; and a catalog document.

41. The apparatus of claim 40, wherein said catalog document aids in resolving a reference within said message.

42. The apparatus of claim 39, wherein said message has one or more properties, each of said properties being either managed or user-provided.

43. The apparatus of claim 39, wherein said means for saving includes means for storing said attachments in the message itself.

44. The apparatus of claim 39, wherein said means for saving includes means for binding a universal resource identifier (URI) to an element in said document.

45. The apparatus of claim 39, wherein said means for converting the document to said community version, said means for converting said document from a community version to a version native to said second community member, and said means for transforming each include means for accessing a transformation registry to determine how to convert between versions.

* * * * *